(12) United States Patent
Pakhunov et al.

(10) Patent No.: US 8,966,222 B2
(45) Date of Patent: Feb. 24, 2015

(54) MESSAGE PASSING IN A CLUSTER-ON-CHIP COMPUTING ENVIRONMENT

(75) Inventors: Alexey Pakhunov, Sammamish, WA (US); Ajith Jayamohan, Redmond, WA (US); Suyash Sinha, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1106 days.

(21) Appl. No.: 12/968,880

(22) Filed: Dec. 15, 2010

(65) Prior Publication Data

US 2012/0159513 A1 Jun. 21, 2012

(51) Int. Cl.
*G06F 9/52* (2006.01)
*G06F 15/78* (2006.01)
*G06F 9/54* (2006.01)

(52) U.S. Cl.
CPC .............. *G06F 15/7807* (2013.01); *G06F 9/52* (2013.01); *G06F 9/544* (2013.01); *G06F 15/7825* (2013.01)
USPC ......................................................... 712/10

(58) Field of Classification Search
CPC .................................................. G06F 12/0813
See application file for complete search history.

(56) References Cited

U.S. PATENT DOCUMENTS

| | | | | |
|---|---|---|---|---|
| 5,047,917 A * | 9/1991 | Athas et al. | ................ | 719/314 |
| 5,276,896 A * | 1/1994 | Rimmer et al. | ............... | 709/216 |
| 6,314,501 B1 * | 11/2001 | Gulick et al. | ................. | 711/153 |
| 2008/0216074 A1 | 9/2008 | Hass et al. | | |
| 2008/0244231 A1 | 10/2008 | Kunze et al. | | |
| 2009/0089511 A1 * | 4/2009 | O'Krafka et al. | ............. | 711/143 |

OTHER PUBLICATIONS

Petersen et al., "Cache Coherence for Shared Memory Multiprocessors Based on Virtual Memory Support", Apr. 13-16, 1993, Parallel Processing Symposium, pp. 49-55.*
Borkar, Thomas S. "Thousand Core Chips—A Technology Perspective". Proceedings of the 44th Annual Design Automation Conference, Jun. 2007. pp. 1-4.
Howard, J., et al. "A 48-Core IA-32 Message-Passing Processor with DVFS in 45nm CMOS". In Intel. Solid-State Circuits Conf. (San Francisco), Feb. 2010. pp. 1-3.
Baumann, A., et al. "The Multikernel: A New OS Architecture for Scalable Multicore Systems". Proceedings of the ACM SIGOPS 22nd Symposium on Operating Systems Principles, Oct. 2009. pp. 29-44.
Nightengale, E.B., et al. "Helios: Heterogeneous Multiprocessing with Satellite Kernels". Proceedings of the ACM SIGOPS 22nd Symposium on Operating Systems Principles, Oct. 2009. pp. 221-334.
Wentzlaff, D. and Agarwal, A. "Factored Operating Systems (fos): The Case for a Scalable Operating System for Multicores". SIGOPS Oper. Syst. Rev., Apr. 2009. pp. 76-85.
Heiser, Gernot, et al. "Towards Trustworthy Computing Systems: Taking Microkernels to the next level". SIGOPS Operating Systems Review, Jul. 2007. pp. 1-9.

(Continued)

*Primary Examiner* — Andrew Caldwell
*Assistant Examiner* — John Lindlof
(74) *Attorney, Agent, or Firm* — Stephen A. Wight; Judy Yee; Micky Minhas

(57) ABSTRACT

Technologies pertaining to cluster-on-chip computing environments are described herein. More particularly, mechanisms for supporting message passing in such environments are described herein, where cluster-on-chip computing environments do not support hardware cache coherency.

20 Claims, 9 Drawing Sheets

(56) References Cited

OTHER PUBLICATIONS

David, Francis M., et al. "CuriOS: Improving Reliability Through Operating System Structure". Proceedings of the 8th USENIX Conference on Operating Systems Design and Implementation, Dec. 2008. pp. 1-14.

Torres-Pomales, Wilfredo. "Software Fault Tolerance: A Tutorial". NASA Langley Technical Report Server, Oct. 2000. pp. 1-66.

Hunt, Galen C. and Larus, James R. Singularity: Rethinking the Software Stack. ACM SIGOPS Operating System Review, 41, (Apr. 2, 2007), 37-49.

Wobber, Ted, et al. "Authorizing Applications in Singularity". Proceedings of the 2007 Eurosys Conference, Mar. 2007. pp. 1-14.

Biena, Christian, et al. "The PARSEC Benchmark Suite: Characterization and Architectural Implications". Proceedings of the 17th International Conference on Parallel Architectures and Compilation Techniques, Oct. 2008. pp. 1-22.

Vangal, S., et al. "An 80-Tile 1.28TFLOPS Network-on-Chip in 65nm CMOS". Solid-State Circuits Conference, 2007. ISSCC 2007. Digest of Technical Papers. IEEE International, Feb. 2007. pp. 5-7.

Geoffray, P., et al. "BIP-SMP: High Performance Message Passing Over a Cluster of Commodity SMPs". Proceedings of the 1999 ACM/IEEE Conference on Supercomputing, Nov. 1999. pp. 1-19.

Mamidala, A., et al. "MPI Collectives on Modern Multicore Clusters: Performance Optimizations and Communication Characteristics". Int'l Symposium on Cluster Computing and the Grid, May, 2008. pp. 1-8.

Pakin, S., et al. "Fast Messages: Efficient, Portable Communication for Workstation Clusters and MPPs". IEEE Parallel Distrib. Technol., Apr. 1997. pp. 60-73.

Shivam, P., et al. EMP: Zero-Copy OS-Bypass NIC-Driven Gigabit Ethernet Message Passing. Proceedings of the 2001 ACM/IEEE Conference on Supercomputing, Nov. 2001. pp. 1-8.

Agarwal, Anant, et al., "The MIT Alewife Machine: A Large-Scale Distributed-Memory Multiprocessor". In proceedings of Workshop on Scalable Shared Memory Multiprocessors, 1991. pp. 1-23.

Kubiatowicz, J., and Agarwal, A. "Anatomy of a Message in the Alewife Multiprocessor". Proceedings of the 7th International Conference on Supercomputing, Jul., 1993. pp. 195-206.

Heinlein, J., et al. "Integration of Message Passing and Shared Memory in the Stanford FLASH Multiprocessor". SIGOPS Oper. Syst. Rev., Dec. 1994. pp. 38-50.

Poole, Jeffrey Hyatt. Implementation of a Hardware-Optimized MPI Library for the SCMP Multiprocessor. Master of Science Thesis, Virginia Polytechnic Institute, 2004. pp. 1-83.

Knauertiase, R., et al. "Using OS Observations to Improve Performance in Multicore Systems". IEEE Micro 28, May 2008. pp. 54-66.

Felten, E.W., et al. Early Experience with Message-Passing on the SHRIMP Multicomputer. SIGARCH Comput. Archit. News 24, May 2, 1996. pp. 296-307.

Chandra, S., et al. "Where is Time Spent in Message-Passing and Shared-Memory Programs?" SIGPLAN, Nov. 1994. pp. 61-73.

Plaat, A., et al. "Sensitivity of Parallel Applications to Large Differences in Bandwidth and Latency in Two-Layer Interconnects". Proceedings of the 5th International Symposium on High Performance Computer Architecture, Jan. 1999. pp. 244-254.

Fähndrich, M., et al. "Language Support for Fast and Reliable Message-Based Communication in Singularity OS". Proceedings of the 1st ACM SIGOPS/EuroSys European Conference on Computer Systems 200, 2006. pp. 177-190.

Clark, John and Jacob, Jeremy. "A Survey of Authentication Protocol Literature: Version 1.0" Retrieved at <<http://condor.depaul.edu/dmumaugh/readings/handouts/crypto/ClarkJacob1997SurveyAuthentication.pdf>>. Nov. 1997. pp. 1-109.

Syed, et al. "A Hybrid Reconfigurable Cluster-on-Chip Architecture with Message Passing Interface for Image Processing Applications". Field Programmable Logic and Applications, Aug. 2007. pp. 609-612.

Ye, Terry Tao. "On-Chip Multiprocessor Communication Network Design and Analysis". Retrieved at <<http://si2.epfl.ch/~demichel/graduates/theses/terry.pdf>>. Dec. 2003. pp. 1-130.

Stiller, Andreas. "About Bold Start-Ups and Managers". Retrieved at <<http://www.top500.org/blog/2009/11/09/about_bold_start_ups_and_managers>>. Nov. 9, 2009. pp. 1-4.

Poletti, et al. "Energy-Efficient Multiprocessor Systems-on-Chip for Embedded Computing: Exploring Programming Models and Their Architectural Support". IEEE Transactions on Computers, vol. 56, No. 5. May 2007. pp. 606-621.

Jeun, et al. "Effective OpenMP Implementation and Translation for Multiprocessor System-On-Chip without Using OS". ASP-DAC 2007. pp. 44-49.

Yoshida, et al. "Session-Based Compilation Framework for Multicore Programming". Formal Methods for Components and Objects, 2008. pp. 1-21.

\* cited by examiner

MESSAGE PASSING IN A CLUSTER-ON-CHIP COMPUTING ENVIRONMENT

BACKGROUND

Technology pertaining to processor design and manufacture has advanced such that many commercially available computing devices include multi-core processors. In the recent past, processors were developed with a single core. The processor core is the portion of the processor that performs reading and execution of instructions. More recently, multi-core processors have been developed, where a multi-core processor is composed of two or more independent cores. Typically, these processor cores are manufactured on a single integrated circuit die.

Extending upon the multi-core architecture, architectures have been proposed that include numerous processor cores (e.g., several cores on a single chip). When such a large number of processor cores are included in a particular architecture, conventional multi-core techniques for message passing, cache coherency, and the like do not scale. Cluster-on-chip (CoC) is a cluster/grid model system that is composed of complex computation, memory and I/O subsystems, all of which are interconnected through a mesh network. There are several challenges to programmability of these cluster-on-chip systems, with the primary challenge being a lack of a hardware cache coherency scheme between cores in the CoC memory typology.

SUMMARY

The following is a brief summary of subject matter that is described in greater detail herein. This summary is not intended to be limiting as to the scope of the claims.

Described herein are various technologies pertaining to configuring a cluster-on-chip computing environment to support message passing between nodes kernels in such environment. An operating system can be implemented in a cluster-on-chip computing environment, wherein the operating system is tasked with managing hardware resources. In an example, the cluster-on-chip computing environment can lack hardware cache coherency, and thus the operating system can be partitioned into several independent components, that are referred to herein as kernels. Each processor core in the cluster-on-chip computing environment can have a kernel executing thereon. Alternatively, multiple cores in the cluster-on-chip computing environment can execute a single kernel. As used herein, the combination of at least one processor core and a kernel executing thereon is referred to as a node.

A cluster-on-chip computing environment described herein includes a plurality of nodes that are interconnected by way of a mesh network, which can be a whole mesh network or a partial mesh network. Accordingly, each node in the cluster-on-chip computing environment is in communication with the mesh network. Furthermore, the cluster-on-chip computing environment may reside on a single chip or may distributed across several chips. A node in the cluster-on-chip computing environment can have access to various memory ranges with different access latencies, wherein each of these memory ranges is accessible by way of the mesh network. For instance, a first memory range may be local to a processor core in a node while a second memory range may be main memory. The cluster-on-chip computing environment further comprises a main memory that can be shared amongst nodes. Additionally, in an exemplary embodiment, memory that is local to a processor core may be accessible to other processor cores in the cluster-on-chip computing environment.

Described herein are several models that can operate in non-cache-coherent systems that support message passing between nodes in such systems. Models that support cache coherency and message passing in such environment that will be described herein include a hierarchical memory model and treatment of messages in such a model, caching models for message passing including but not limited to the use of non-cached memory, cache line flushes, hardware cache invalidation, software cache invalidation, amongst others. Moreover, message structure, inspection of messages, message resource allocation and de-allocation, and message transfer and signaling are described herein, wherein the message structure is configured to support message passing in such a cluster-on-chip computing environment. Still further, technologies pertaining to emulated direct memory access for large messages, a model that causes a node in the cluster-on-chip computing environment to act as a dedicated message-passing node, and lazy construction of uninitialized computer-implemented objects are described herein.

Other aspects will be appreciated upon reading and understanding the attached figures and description.

DETAILED DESCRIPTION

Figure 1:
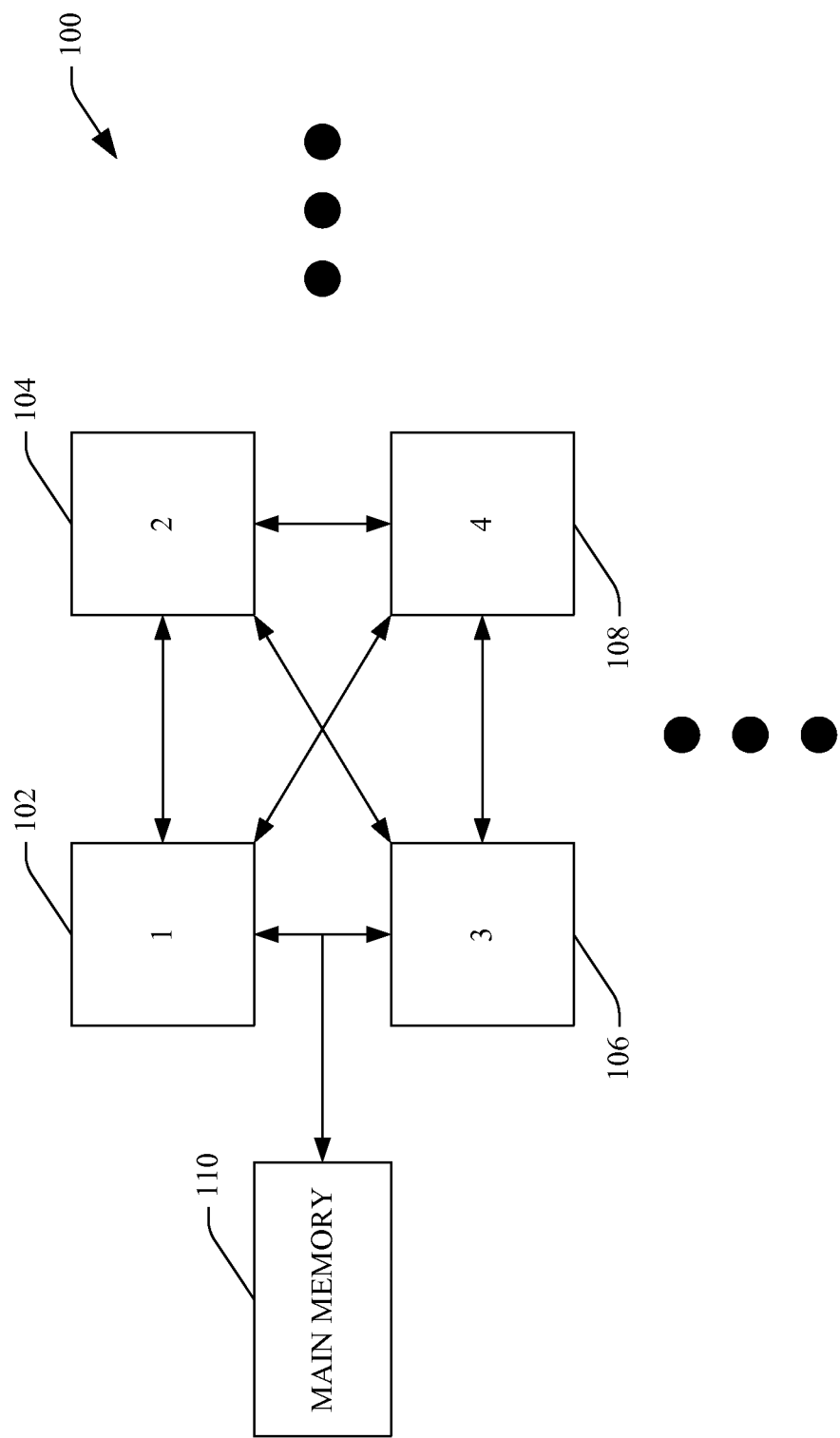
FIG. 1 is a functional block diagram of an exemplary cluster-on-chip computing environment.

Various technologies pertaining to message passing in a cluster-on-chip computing environment will now be described with reference to the drawings, where like reference numerals represent like elements throughout. In addition, several functional block diagrams of exemplary systems are illustrated and described herein for purposes of explanation; however, it is to be understood that functionality that is described as being carried out by certain system components may be performed by multiple components. Similarly, for instance, a component may be configured to perform functionality that is described as being carried out by multiple components. Additionally, as used herein, the term "exemplary" is intended to mean serving as an illustration or example of something, and is not intended to indicate a preference.

With reference to FIG. 1, an exemplary cluster-on-chip computing environment 100 is illustrated. The cluster-on-chip computing environment 100 can comprise a plurality of processor cores and various ranges of memory. The cores and the ranges of memory can be managed by an operating system, which can consist of a plurality of independently operating components (kernels). In an example, each core can execute a kernel. In another example, multiple cores can operate in conjunction to execute a kernel. A node in the cluster-on-chip computing environment 100 comprises at least one processor core and a kernel executing thereon.

The cluster-on-chip computing environment 100 comprises a plurality of nodes 102-108. A node in the cluster-on-chip computing environment, as mentioned above, can comprise at least one processor core and a kernel executing thereon. In an example, a node in the cluster-on-chip computing environment may also comprise local private memory. For example, the first node 102 can comprise a first processor core and a memory that is proximate to the first processor core. Similarly, the second node 104 can comprise a second processor core and associated second local memory, the third node 106 can comprise a third processor core and associated third local memory, and the fourth node 108 can comprise a fourth processor core and associated fourth local memory. It is to be understood, however, that a node need not have local memory. Rather, a node can have access to several memory ranges with different latencies corresponding thereto.

The nodes 102-108 are in communication with one another by way of a mesh network. Additionally, the nodes 102-108 can access different memory ranges by way of the mesh network. The mesh network may be a full mesh network, where each node is directly connected to every other node in the cluster-on-chip computing environment, or a partial mesh network, where nodes may be interconnected by way of other nodes and/or routers.

As mentioned above, one or more of the nodes 102-108 can have local memory associated therewith. In an example, a local memory corresponding to a node can be partitioned into ranges: a private range that is accessible only to the node and a shared range that is accessible to other nodes in the cluster-on-chip computing environment 100. Thus, for instance, the first node 102 can at least temporarily store data in the local memory of the second node 104, and can access such memory when desired.

The cluster-on-chip computing environment 100 may also comprise a main memory 110, wherein the main memory 110 can be shared amongst a plurality of nodes in the cluster-on-chip computing environment. The main memory 110 is typically associated with a higher amount of latency when compared with local memories of the nodes 102-108 in the cluster-on-chip computing environment. Thus, for example, it may be faster for the processor core in the node 106 to access the associated local memory in the third node 106 than it is to access the main memory 110. In a specific exemplary implementation of the cluster-on-chip computing environment 100, such cluster-on-chip computing environment 100 may have 48 cores, where such cores are arranged in tiles comprising two cores apiece. Accordingly, the tiles can be arranged in four rows of six, and the tiles can be interconnected through a mesh that is wired for fast interconnection between cores. Additionally, the cluster-on-chip computing environment 100 may comprise four on-die memory controllers that are each capable of addressing a significant amount of RAM that is located off-die. For instance, the four on-die memory controllers can address up to 64 gigabytes of DDR3 memory. In addition, as indicated above, each core can have a 16-kilobyte local on-die memory. This local memory may be referred to herein as a message buffer. Of course, other implementations of a cluster-on-chip computing environment are also contemplated, wherein such implementations can include more or fewer memory controllers, more or less main memory, etc. Further, as indicated above, memory and other hardware resources of nodes can be dynamically mapped to address space of one or more cores of such nodes. Thus it is possible to share regions of memory between nodes and establish new views to local on-die fast memory or remote slow off-chip memory.

In an exemplary implementation, the nodes 102-108 in the cluster-on-chip computing environment 100 can be configured as follows: a memory map of each node in the cluster-on-chip computing environment 100 can be partitioned into at least one private memory region that a processor core in such node will have exclusive access to, and at least one shared region. The shared region is accessible by other nodes in the cluster-on-chip computing environment 100. However, precautions can be taken, as the cluster-on-chip computing environment 100 does not support hardware cache coherency. Thus there is no guarantee that when a processor core reads from a cache that the data in the cache will be up-to-date.

Furthermore, each of the nodes 102-108 in the cluster-on-chip computing environment can alter physical memory mapping dynamically. Operating system kernels corresponding to the nodes 102-108 can create new mappings to the physical memory regions that were previously inaccessible, or revoke a map view so that future access will fail, or alter the map view to point to a new physical region.

As indicated above, the hardware in the cluster-on-chip system 100 does not support hardware cache coherency. However, such hardware may provide limited support for maintaining cache coherency through utilization of software executing on the nodes. This hardware support can include providing partition views of memory, an ability to flush cache lines and map memory with different caching policies. For instance, a message buffer can be accessed directly, without getting on the mesh and router, and such access to a message buffer is termed as a local access. If the message buffer is accessed through a mesh router, it can be referred to as a remote access. The hardware of the cluster-on-chip computing environment 100 can provide capability to both local and remote message buffer accesses.

In an example, the system memory corresponding to the node 102 can be mapped to the local associated memory region to keep operating system and application data mostly independent of remote memory accesses and to provide better reliability. It can be understood that message passing through defined channels by the operating system may be a primary conduit to perform internode communication. This also has a benefit in that the operating system executing applications may not be enlightened to be aware of operating under non-cache-coherent memory systems, and can instead rely on specific message passing constructs which can take advantage of caching policies and software managed coherency to provide relatively fast message passing services. Specifically, only the message passing models in the operating system kernels need to be designed to manage the notion of software managed coherency and multiple coherent domains.

Figure 2:
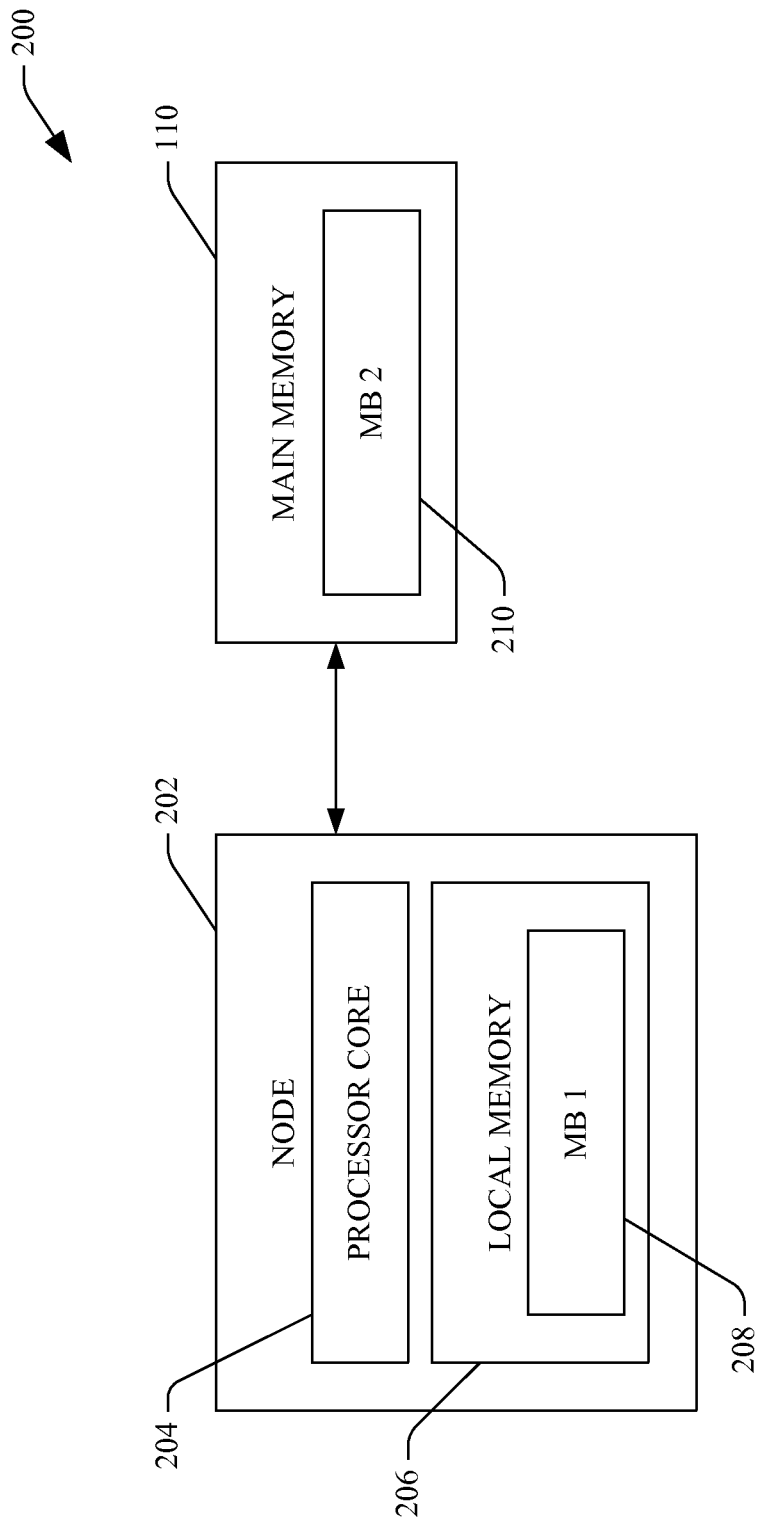
FIG. 2 is a functional block diagram of an exemplary node in a cluster-on-chip computing environment.

With reference now to FIG. 2, an exemplary tiered buffer architecture 200 is illustrated. The architecture 200 comprises a node 202 in a cluster-on-chip computing environment. As described above, the node 202 includes at least one processor core 204 and a kernel executing thereon. In this example, the node 202 additionally comprises a local on-chip memory 206, although it is to be understood that off-chip memory can be substituted for the on-chip memory with low latency with respect to the processor core 204 can be utilized if the node 202 does not comprise on-chip memory. In this architecture, however, as the processor core 204 need not access the local memory 206 by way of the mesh network, access by the processor core 204 to the local memory 206 may occur relatively quickly. Additionally, the node 202 can have access to the main memory 110. However, accesses to the main memory 110 may be slower than accesses to the local memory 206. Furthermore, though not shown, the processor core 204 may have accesses to local memories of other nodes in the cluster-on-chip computing environment. Accesses to such local memories, however, need to be made through the mesh network, and are thus slower than accesses to the local memory 206.

In an example, at least a portion of the memory 206 may be configured as a first message buffer 208. This first message buffer 208 may receive messages transmitted by other nodes in the cluster-on-chip computing environment when the node 202 is a recipient of a message. In another example, the first message buffer 208 can be configured as a sending buffer, such that when the node 202 wishes to transmit a message to another node in the cluster-on-chip computing environment, the first message buffer 208 can retain messages that are desirably transmitted from such node 202 to another node.

The first message buffer 208, however, may be relatively small, since the local memory 206 is relatively small. Thus, for example, the node 202 may receive several messages from several other nodes which may not all be able to be retained in the first message buffer 208. Accordingly, a portion of the main memory 110 can be configured as a second message buffer 210 for the node 202. Since the processor core 204 can access the local memory 206 faster than it can access the main memory 110, it is desirable to place as many messages as possible in the first message buffer 208. Additionally, it is desirable to place data that is going to be frequently accessed by the processor core 204 in the first message buffer 208 in the local memory 206. Additional details pertaining to the first message buffer 208 and the second message buffer 210 and what data can be stored therein will be provided herein.

In an example, the first message buffer 208 and the second message buffer 210 can be configured as ring buffers. Allocation of space in each of the message buffers 208 and 210 can be controlled by two pointers, a read pointer that specifies the first byte in the buffer that is yet to be consumed by a node that is receiving a message, and a write pointer that specifies a location in the message buffer where a sender node can insert data. If both pointers are equal, then the message buffer is empty. It is to be understood that the write pointer is not equal to the read pointer when the buffer is not empty.

As used herein, the combination of the read pointer and write pointer can be referred to as a control structure. Generally, control structures can be mapped with a cache disable policy to ensure that reads and writes to the control structures always access the backing memory and not the cache. Additionally, since the control structures are accessed relatively frequently, such control structures can be placed in the first message buffer 208. Thus, the read and write pointers for the second message buffer 210 in the main memory 110 can be retained in the first message buffer 208 in the local memory 206. In summary, it can be ascertained that message buffers for the node 202 can span across the local memory 206 and the main memory 110.

Figure 3:
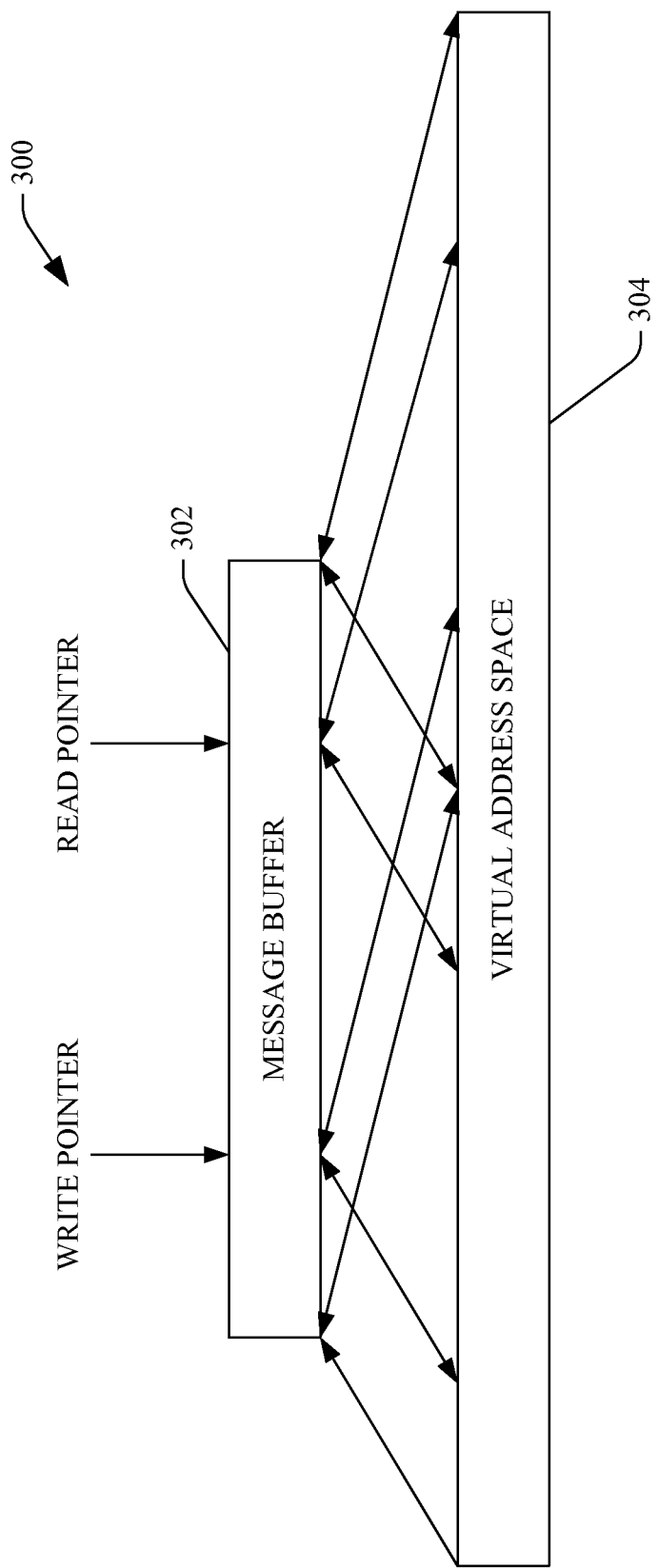
FIG. 3 is an exemplary message buffer mapped to virtual address space.

Turning now to FIG. 3, an exemplary mapping 300 of a message buffer 302 to virtual address space is illustrated. The message buffer 302 has a read pointer and a write pointer corresponding thereto. As indicated above, the message buffer 302 can be implemented as a ring buffer, such that a message can wrap around the back of the message buffer 302 to the front of the message buffer 302. The read pointer indicates to a node that has received a message where the next message to be accessed is located in the message buffer 302, and the write pointer indicates to senders of messages where they can begin to write a message. A space between the write pointer and the read pointer is the amount of memory that is available for senders to write messages to the message buffer 302. If there is insufficient space for a sender to place a message in the message buffer 302, one of a variety of actions can be undertaken.

First, the sender can access another message buffer corresponding to the receiver node, wherein the other message buffer is placed in a memory with higher latency. Alternatively, the sender node can partition the message that is desirably transmitted to the receiver node into multiple portions, and cause a first portion to be stored in the message buffer 302 and a second portion to be stored in another message buffer or other suitable memory location. The portion stored in the message buffer 302 can indicate where the remainder of the message resides. In another example, the sender can simply wait to transmit the message until the receiver node has removed one or more messages from the message buffer 302. Other alternatives for passing the message if the message cannot be retained in the message buffer 302 include utilization of direct memory access, emulated direct memory access (which will be described below), amongst other actions. The logic utilized by the sender nodes to decide where to place a message can be mirrored at the receiver node, such that the receiver node can have knowledge of where to find messages transmitted by a particular sender node.

In an exemplary embodiment, the message buffer 302 can be double mapped to virtual address space 304. That is, the message buffer 302 can be mapped twice to virtual address space 304, wherein both mapped regions are located next to one another. This can simplify the handling of a situation where a message wraps from the back of the message buffer 302 to the front of the message buffer 302. Since the message buffer 302 is double mapped to the virtual address space 304, both senders and receivers can read and write data in a message as one consecutive block. Thus, for instance, a receiver of a message need not copy a wrapped message to a temporary buffer in order to pass such message to a message handler. As will be understood by one skilled in the art, this double mapping requires that both the message buffer address and size be page-aligned. Otherwise, a gap will exist between mappings, and a receiver node will be unable to read a wrapped message without copying such message to a temporary buffer. It will also be understood that double mapping may cause issues if a CPU cache is using virtual addresses as cache indices. In such a case, a second set of virtual addresses will be cached in different cache lines, which will cause a race condition between two mappings. Caches that use physical addresses as cache indices are free of such issue.

Figure 4:
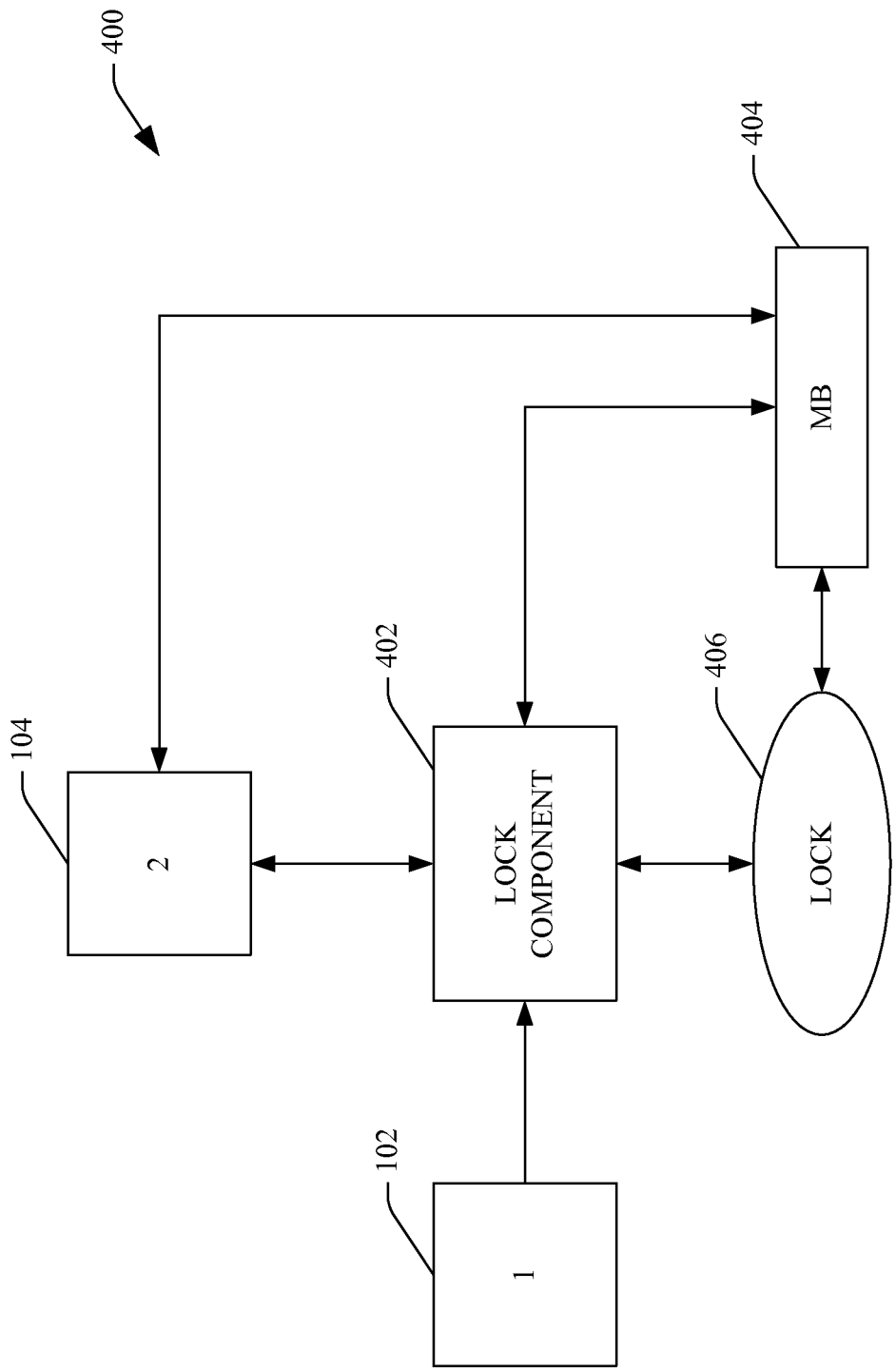
FIG. 4 is a functional block diagram of an exemplary system that facilitates placing a lock on a message buffer for space allocation.

Referring now to FIG. 4, an exemplary system 400 that facilitates allocating space in a message buffer to a sender of a message and to determining where to read a message is illustrated. The system 400 comprises the first node 102 and the second node 104 in a cluster-on-chip computing environment, wherein the first node 102 and the second node 104, while not shown, are in communication by way of a mesh network. In this example, the first node 102 wishes to transmit a message to the second node 104. The system 400 comprises a lock component 402, which facilitates locking access to control structures in a message buffer 404 that corresponds to the second node 104. The lock component 402 can call an atomic hardware lock 406, wherein the lock 406 prevents other nodes from accessing the message buffer 404 when the second node 104 possesses the lock 406.

When the first node 102 wishes to transmit a message to the second node 104, the first node 102 requests the lock 406 by way of the lock component 402. Once the first node has the lock 406, the first node 102 can analyze the read and write pointers for the buffer 404 in such message buffer 404 (or for some other buffer). The first node 102 can then ascertain whether there is sufficient space between the read pointer and the write pointer for the message that is desirably transmitted to the second node 104. If sufficient space exists, the first node 102 can cause the write pointer to be advanced such that another node that wishes to transmit a message to the second node 104 will not overwrite the message transmitted by the first node 102 until the second node 104 has processed such message.

The second node 104 can periodically poll the read pointer in the message buffer 404 to determine if a node has transmitted a message to the message buffer 404 and if the message is ready for processing. Specifically, the second node 104 can check a status flag embedded in a message to determine if the message is ready for processing. If a message exists in the message buffer 404 and is ready for processing, the second node 104 can call a message handler that processes the message in the message buffer 404. The message handler may then send an indication to the second node 104 when the message has been processed, and the second node 104 can acquire the lock 406 by way of the lock component 402. Once the second node 104 has acquired the lock 406, the second node 104 can move the read pointer in the message buffer 404, thereby indicating that the message transmitted by the first node 102 has been processed.

While the system 400 illustrates a single message sender (the first node 102), it is to be understood that multiple sender nodes can simultaneously copy data to the message buffer 404. For instance, the first node 102 can acquire the lock 406 and move the write pointer in the message buffer 404 to allocate space for a message that is desirably copied to such message buffer 404. The first node 102 may then begin copying data to the message buffer 404. While the first node 102 is copying data to the message buffer 404, another node may wish to transmit a message to the second node 104. This other node may acquire the lock 406 via the lock component 402, and can allocate space in the message buffer 404 for a message desirably transmitted to the second node 104. Once such space has been allocated, the lock 406 can be released, and the other node can begin copying the message to the message buffer 404 at the same time that the first node 102 is copying data to the message buffer 404. Additionally, the second node 104 can read data from the message buffer 404 while the first node 102 is copying data to the message buffer 404 (and while other nodes are copying data to the message buffer 404). Accordingly, messages can be efficiently processed in the cluster-on-chip computing environment.

Figure 5:
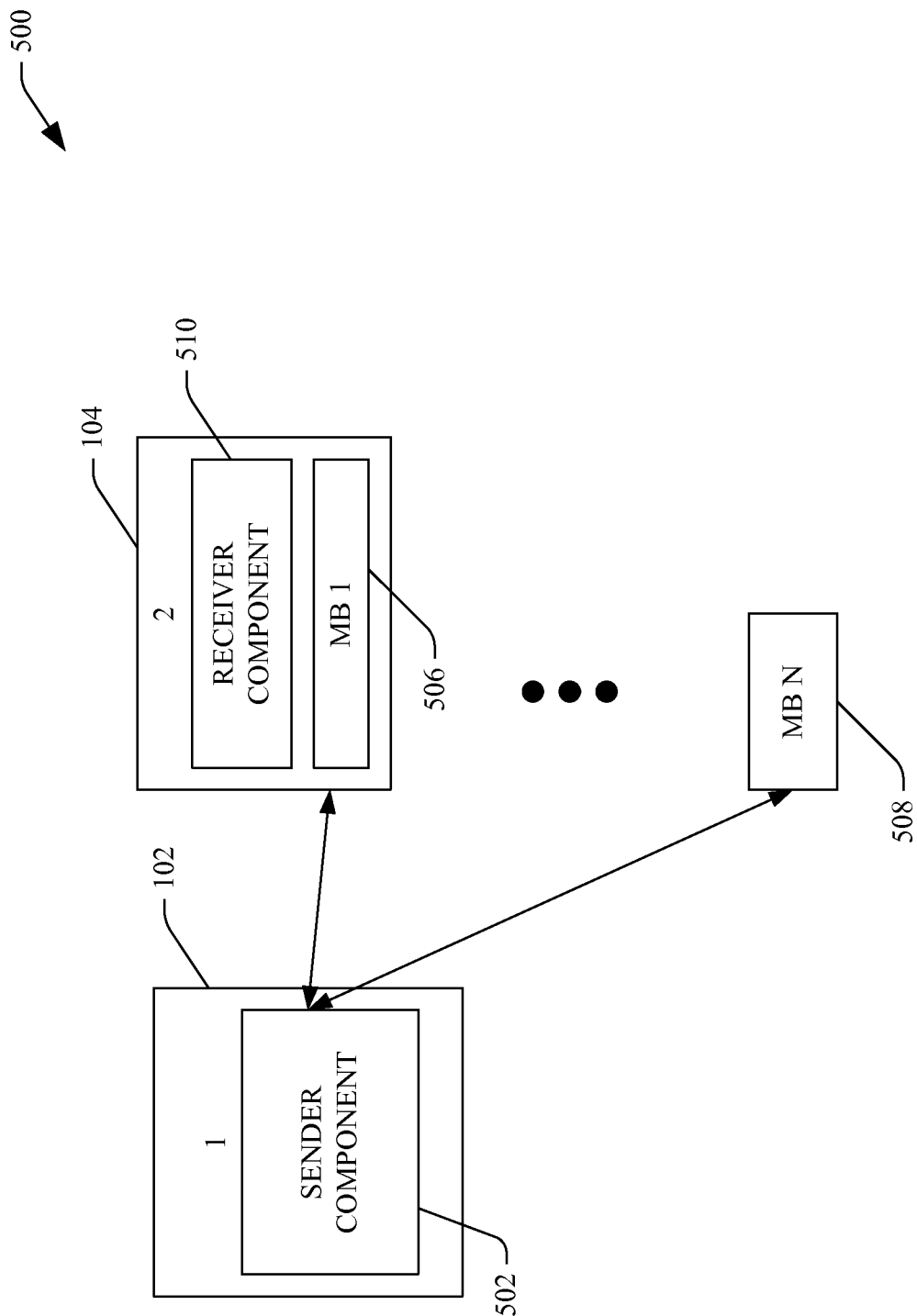
FIG. 5 is a functional block diagram of an exemplary system that facilitates selectively passing messages to memory locations corresponding to a node in a cluster-on-chip computing environment.

Referring now to FIG. 5, an exemplary system 500 that facilitates selectively storing a message in an appropriate message buffer in a tiered memory hierarchy model is illustrated. The system 500 comprises the first node 102 and the second node 104. The first node 102 comprises a sender component 502 that is configured to prepare and transmit a message to be processed by the second node 104. The sender component 502 can selectively cause the message to be stored in an appropriate message buffer that resides in tiered memory. Additionally, the sender component 502 can partition the message such that a first portion resides in a first message buffer and a second portion resides in a second message buffer. In a particular example, the sender component 502 can cause a header portion of the message (metadata) to be stored in a first message buffer (e.g., in memory local to the second node 104) and a payload portion of the message to be stored in a message buffer in a second memory (e.g., off-chip main memory). The metadata can include information such as location of the remainder of the message, types or content of the message, etc.

When selectively ascertaining where to store the message, the sender component 502 can access the lock described above and analyze locations of the read pointer and write pointer in, for instance, a message buffer 506 that is local to the second node 104. It is desirable to store most messages that are to be processed by the second node 104, or as many of such messages as possible, in such message buffer 506, as a processor core in the second node 104 will have quickest access to contents in such message buffer 506. If the size of the message is not above a threshold size (which can be predetermined or dynamically adapted, depending on allocated resources) and/or the size of the message is below an amount of space available in the message buffer 506, the sender component 502 can cause the entirety of the message to be stored in the message buffer 506.

If the message is above the threshold size and/or there is insufficient space in the message buffer 506 for the message, then the sender component 502, for instance, can partition the message into different portions, a first portion (metadata) that indicates contents of the message, etc., and a second portion that includes a payload. It is to be understood that the sender component 502 can partition the message into any suitable number of portions. For instance, the sender component 502 can partition the payload of the message into several different pieces. The metadata is desirably retained in the message buffer 506, as it will be accessed more frequently than the payload. For instance, such metadata may be processed in some fashion while the payload may simply be copied to hardware registers. The sender component 502 may then cause the payload of the message to be stored in another message buffer (e.g., an nth message buffer 508). The sender component 502 can cause the metadata to include data that indicates that the payload of the message is stored in the nth message buffer 508 such that when the processor core of the second node 104 accesses the metadata of the message in the message buffer 506, it can know where to locate the payload. In an example, the sender node and the receiver node follow the same convention, and thus the receiver node will have knowledge of where to look for messages that are transmitted thereto.

In an exemplary embodiment, each of the message buffers 506-508 may be a ring buffer, and may have control structures corresponding thereto retained in the message buffer 506. Furthermore, while the sender component 504 is shown as being included in the first node 102, it is to be understood that the second node 104 may include functionality that dictates where received messages are to be stored and/or how received messages are to be partitioned. There are a variety of algorithms that can be utilized in such an implementation. For instance, the first node 102 and the second node 104 can agree on where messages are to be placed, for instance, when such nodes are booted. Additionally or alternatively, the first node 102 and the second node 104 can utilize static or dynamic thresholds to ascertain where to place a message as a function of message size and queue state. If dynamic thresholds are employed, the first node 102 and the second node 104 can agree on algorithms utilized to calculate the dynamic threshold(s) prior to exchanging messages. In yet another example, the first node 102 and the second node 104 can transmit out of band information/control flow messages that are taken into account when determining where to place messages. Other mechanisms are also contemplated and are intended to fall under the scope of the hereto-appended claims. In yet another embodiment, an intermediary node or device (such as a router on the mesh network) can include the sender component 502.

The second node 104 comprises a receiver component 510 that can set a flag or status bit to indicate that the message transmitted by the first node 102 is ready to be processed. As described above, the second node 104 can periodically or continuously poll the control structures in the message buffer 506 to ascertain whether any new messages have been received from other nodes in the cluster-on-chip computing environment, and can check a status flag to determine if a message is ready for processing. In another example, the nodes may be configured to transmit and recognize interrupts that indicate that a message has been transmitted from a sender node and is resident in a message buffer that is accessible to the receiver node (the second node 104).

Figure 6:
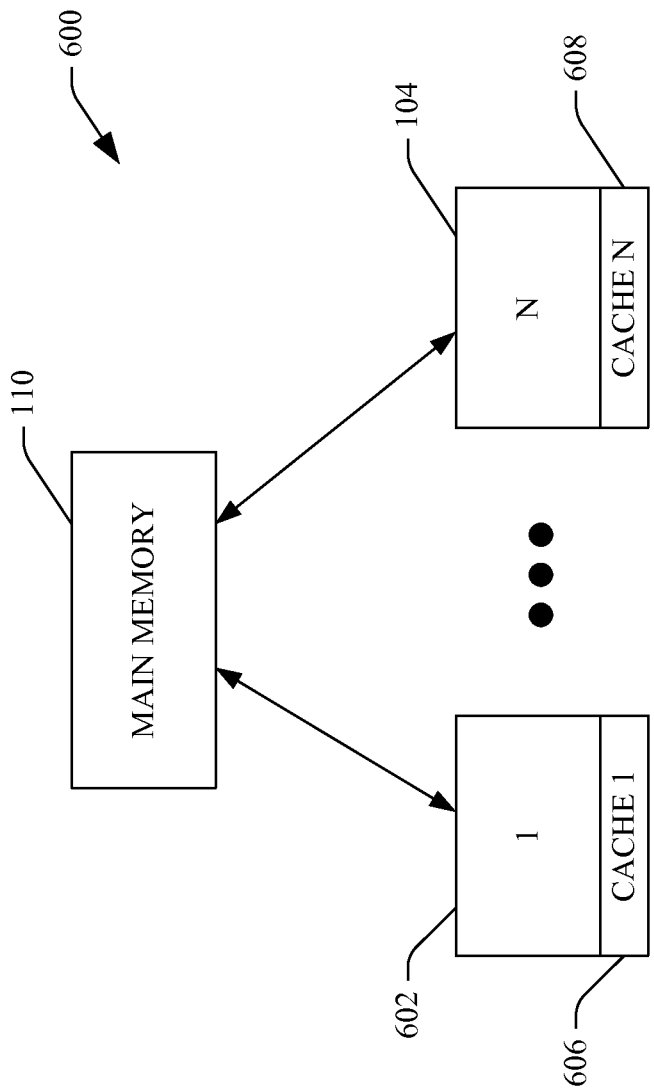
FIG. 6 is a functional block diagram of an exemplary architecture of a cluster-on-chip computing environment.

With reference now to FIG. 6, an exemplary cluster-on-chip computing environment 600 is illustrated. As described above, the cluster-on-chip computing environment 600 comprises a plurality of nodes 602-604. Each of these nodes has at least one processor core and a kernel executing thereon. Additionally, one or more of the nodes 602-604 may have local memory associated therewith. The nodes 602-604 may have caches 606 and 608, respectively, corresponding thereto, wherein the caches 606 and 608 can be backed by local memory or the main memory 110. As indicated above, the cluster-on-chip computing environment is not configured with hardware cache coherency. In some situations, it may be desirable to ensure that all reads to memory and writes to memory are done directly to memory, and data is not read from or written to the cache. For instance, when one core wishes to share data with other cores, it may be desirable that all memory reads and writes are done directly to memory, and data is not read from or written to the cache.

Figure 7:
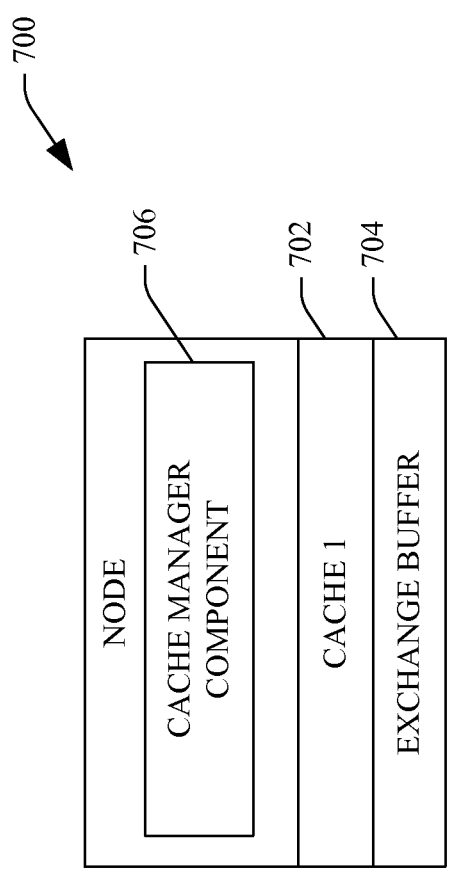
FIG. 7 is a functional block diagram of an exemplary system that facilitates managing a cache in a cluster-on-chip computing environment.

Now referring to FIG. 7, an exemplary node 700 in a cluster-on-chip computing environment is illustrated. The node 700 comprises a cache 702 that is backed by local memory in the node 700 or main memory that is accessible to the node 700. Node 700 further comprises an exchange buffer 704 that can reside in the local memory of the node 700. The exchange buffer 704 is an area of memory where a message is written to if the node 700 is a sender node in order to pass a message to an intended recipient node. Alternatively, the exchange buffer 704 can be a location where a message is read if the node 700 is a receiver node after the message is delivered. The exchange buffer 704 may not be in the same location with respect to when the node 700 acts as a sender or receiver.

Unlike traditional architectures, non-cache coherent systems do not make any effort to maintain consistency of data exchanged between nodes. Thus it becomes the responsibility of an operating system that is executing on the nodes in the cluster-on-chip computing environment to maintain cache coherency. Specifically, in the case of passing messages between cores, operating systems should ensure that a sender has written a message to the memory before a receiver node attempts to read such message. Likewise, a receiver of a message should guarantee that the message is fetched from the memory, not from a CPU cache.

Both a sender and a receiver node can read and write from/to the exchange buffer 704. For instance, control structures of a shared ring buffer may be read and written by both a sender and a receiver node. It can be ascertained, however, that sender nodes mostly write data and rarely read it, while receiver nodes do the opposite. A substantially optimized caching strategy is possible when this is taken into consideration.

The node 700 comprises a cache manager component 706 that manages the cache 702 such that data is read from and written to memory, and not from the cache 702. In an example, the cache manager component 706 can map the exchange buffer 704 as non-cached, thereby eliminating all caching effects. In this case, the node 700 will read and write memory directly, bypassing the cache 702. In such an implementation, each memory operation accessing the exchange buffer 704 may transfer less data. When the exchange buffer 702 is labeled as cache, data is moved between the local memory and cache in whole cache lines, which are typically larger than a widest CPU register that is available. Thus, more memory operations will be needed to transfer the same amount of data, thereby increasing latency.

In another embodiment, the cache manager component 706 may be configured to flash individual cache lines to memory. Specifically, some processors support invalidation and flashing to memory of individual lines of the cache 702. In such a case, the cache manager component 706, if the node 700 is a sender, can flush all cache lines occupied by a message in the exchange buffer 704 before notifying a transport layer that the message is desirably transmitted. Additionally, if the node 700 is a receiver of a message, the cache manager component 706 can flush or invalidate all cache lines occupied by the message in the exchange buffer 704 to ensure that the cache will be updated with newly arrived data. Unfortunately, not all hardware may support such functionality.

For instance, some processor architectures may support commands for invalidation and flashing to memory of complete contents of the cache 702. Thus, the cache manager component 706 can flush the entirety of the cache 702. The operation of invalidating or flushing the entirety of the cache 702 may be a relatively expensive operation, as it takes time to write all data from the cache to memory, and large portions of invalidated data may be brought back into the cache 702. The cache manager component 706 can perform a flushing the entirety of the cache 702 or invalidate the entirety of the cache 702 when communications between nodes are infrequent but a size of a message is relatively large. Another drawback of such an approach is that instructions for flushing the entirety of the cache 702 may be ignored by some caches. Invalidation of an external cache may be performed by system board hardware. Additionally, the processor core of the node 700 may not wait until invalidation of the external cache is complete prior to performing some form of data processing. Accordingly, only caches that can be flushed in this manner should be enabled for the exchange buffer 704, which is achievable on some hardware platforms.

In yet another embodiment, the cache manager component 706 may be a portion of an operating system that intelligently flushes contents of the cache 702. CPU caches typically implement some form of least-recently-used (LRU) cache management policy. When the cache 702 is full, the least-recently-used cache line is evicted from the cache to make room for newly accessed data. Touching the exact number of cache lines (flush range) that fit to the cache will update the entire contents of the cache. All data outside of such flush range will be flushed to memory. Accordingly, the cache manager component 706 can determine and align the flush range in memory appropriately to ensure that no two lines are mapped to the same line in the cache 702.

Further, some processors may support a relaxed or pseudo LRU policy. In such a case, one or more lines in the cache 702 are selected for eviction by a less precise algorithm. The same approach as described above may work in situations where a pseudo LRU policy is enforced. This type of cache invalidation can be a relatively expensive operation. To amortize costs, the cache manager component 706 can place the flush range over a "hot" area of memory; that is, an area of memory that is accessed most often; thereby maximizing the probability of re-using of already cached data.

In yet another example, the cache manager component 706 can initiate the exchange buffer 704 to be relatively large. More specifically, caches have limited size. By making the exchange buffer 704 sufficiently large, it is possible to force updating caches from the memory. For instance, the cache manager component 706 can allocate a buffer at least twice the size of the largest cache. Such buffer can be organized as a ring buffer, and the receiver node can guarantee that contents of the ring buffer will be accessed sequentially, wrapping to the beginning of the ring buffer when the end of the message is reached. Senders can place data in the tail of the buffer, and the receiver can read from the head of the buffer. The receiver can further guarantee that each cache line will be read, and the receiver does not write to the buffer. Furthermore, the size of a single block of data may not exceed the size of the largest cache. If the node 700 is a receiver node and obeys the above, the cache manager component 706 can ensure that every new cache line accessed will be read from the memory. In other words, the steps above guarantee that the cache 702 will be completely refreshed by the time a particular line will be used again. In an example, this embodiment can be employed with caches implementing a strict LRU cache policy. This type of caching model has almost no runtime overhead, because it does not require explicit cache line eviction, but other limitations are associated with such model. For example, this can only be implemented when the node 700 is a receiver node. Moreover, it requires in-order processing, or pre-processing, of messages. Furthermore, debugging and memory inspection may be made more difficult because a debugger will need to flush CPU caches after touching any memory within the exchange buffer 704.

Referring back to FIG. 5, various parameters that can be considered by the storage component 504 when determining where to store the message desirably transmitted by the first node 102 to the second node 104. First, the storage component 504 can consider the structure of the message. The storage component 504 may then selectively place the message or portions thereof in one or more of the message buffers 506-508, based at least in part upon the structure of the message. In an example, the message can have structured information as follows: a message metadata header that includes information needed to reconstruct the message structure at the receiver node 104, such as message type, size, list of objects/data blocks composing the message and reference between them, etc.

The message metadata may include information that originates at higher levels of abstraction. For instance, such metadata can be or include data that describes code that can serialize and de-serialize parameters of remote calls. In another example, the message metadata can include metadata prepared by a particular compiler, accompanied with runtime information about object layout in a heap.

In an example, the following method may be called remotely: Int Add (Int left, Int right). A request message will comprise three portions: the message metadata specifying that there are two data blocks in the message, as well as the data blocks themselves, the values of the left and right parameters, and in more complex cases, the entire objects or graphs of objects can be passed in the message. When this is the case, the metadata information can include information pertaining to the links between objects, such that an identical object structure can be represented at the second node 104. In instances where the message desirably transmitted to the second node 104 does not have a specific structure, the storage component 504 can opt to packetize, reassemble, and introduce simple metadata to make the message packets appear in chunks to fit into different layers of memory. The storage component 504 may then direct these chunks to the appropriate layers in the memory hierarchy.

Additionally, the storage component 504 can inspect contents of messages such that they are placed in appropriate message buffers. Both the message and the state of the message-passage buffers 506-508 can be considered by the storage component 504. For example, a total size of a message and size of individual data blocks can be analyzed by the storage component 504. In an ideal scenario, every message can be placed by the storage component 504 in the fastest message-passage buffer (the message buffer 506). As described above, the fastest buffer is typically the smallest, such that large messages are to be placed in larger and slower message buffers. Very large messages (messages larger than available space in all message buffers) cannot be placed in buffers, and therefore some other mechanism can be used to transfer such messages to the second node 104. Additionally, some portions of a message are accessed more often than others, and such portions can be given preference in getting space from faster message buffers.

Additionally, the state of the message buffers 506-508 can be considered by the storage component 504 when directing messages thereto. When a faster buffer is full, the storage component 504 can place a message in a slower buffer, rather than waiting until the faster buffer is drained by the receiving node 104. Unlike message inspection, buffer inspection may require taking the hardware lock described above to synchronize access, which may be undesirable. Other options include reading control structures in the message buffer while holding the lock to determine whether there is sufficient space for the message. Alternatively, control structures may not be consulted, but previously cached states can be used based on a last-sent operation.

When inspecting buffers, the storage component 504 can use adaptive thresholds to decide whether a buffer is considered to be full. For instance, the fastest buffer can be used to hold both message metadata and data blocks until the buffer is half full. Once the buffer is half full, data blocks can be placed to a message buffer in a lower level in the memory hierarchy. This is desirable because the message metadata is inspected by the receiving node 104 to determine if the sender node 102 completed copying the message to the message buffer. Thus, placing message metadata at a topmost buffer in a memory hierarchy can optimize the receiver's functionality of looking at arriving messages.

As indicated above, in some situations a message cannot be placed in a message buffer. There are various ways this scenario can be handled. These large messages can be considered as an error that occurred in software, and can be rejected. Large messages can be fragmented and transmitted portion by portion from the sender node 102 to the receiver node 104. Finally, these messages can be copied directly from private/local memory of the sender node 102 to private/local memory of the receiver node 104. If a message is fragmented and transmitted in portions, an out-of-memory error may occur at the receiver node after half of a message is received. This does not occur with the lattermost option provided above, as this situation can be detected prior to transmitting most of the message data. There is another drawback, however, as the third option is expensive in terms of CPU cycles due to specifics that may be associated with hardware of a cluster-on-chip computing environment.

As described above, each node can get access to any memory in the cluster-on-chip computing environment. Accordingly, any node can also read and write memory mappings of every other core in the system. Given these hardware parameters, a manner in which a message can be copied directly from private memory of a sender node to private memory of a receiver node can occur as follows: The sender node 102 can flush all cache lines mapped to the message to be transferred. If the hardware does not support flushing of individual cache lines, then the entire cache can be flushed. This can be achieved by reading a particular amount of otherwise unused memory, which can replace the content of the cache entirely. Size of the memory read can be chosen based at least in part upon size of a largest cache in the cluster-on-chip computing environment.

Subsequent to the cache lines being mapped to the message to be transferred, the sender node 102 can send physical address and size of an exchange buffer to transfer to the receiver node 104 as part of the message data. These parameters can be placed, for instance, in a ring buffer corresponding to the message buffer 506.

At this point, the receiver node 104 can map a sender's memory to its own physical address space. Thus, the physical address can be mapped to a lookup table (LUT) entry index. The sender node 104 may then copy the mapping from the LUT of the sender node 104 to its own dedicated LUT entry, thereby effectively mapping the memory of the sender 102 to its own physical address space. If this block does not fit the range provided by a single LUT entry, the process can be repeated for consecutive LUT entries. Thereafter, the receiver node 104 can map the memory range corresponding to its LUT entry as uncached, to ensure that data will be read from the memory, and the receiver node 104 can copy the message piece by piece.

Referring back to FIG. 1, the cluster-on-chip computing environment 100 includes numerous nodes 102-108. In an exemplary implementation, at least one of these nodes can be dedicated to operate as a transmitter of messages. That is, at least one of such nodes can be dedicated to move messages between local memory buffers of nodes that run some other code. In this way, the nodes that are not dedicated transmitter nodes can place and get messages to and from their fast local memories, thereby avoiding the tax of writing to removed memory. Accordingly, these nodes can spend additional time performing desired computations. This may come at a cost of longer overall latencies of transmitting a message, which in some cases may be tolerable.

In an exemplary implementation, one core on each tile in the cluster-on-chip computing environment can be dedicated to move message data between tiles. Two buffers may exist in local memory of equal size: incoming and outgoing buffers. The generic core or cores not dedicated to move messages will place messages in the outgoing buffer, and the message-passing core can pick data up therefrom and move such message to an incoming buffer of a recipient core.

Some messages desirably transmitted in a cluster-on-chip computing environment may include objects written in a managed language such as C#. Managed languages such as C# require that all objects be completely initialized before they can be used. However, initialization of objects may not be necessary if the object is created only to be overwritten at a later point in time. For instance, a buffer can be passed a read file call. Instead of initializing such object during runtime the object can be marked as uninitialized, and initialization can be performed if the message is accessed or when the message is accessed for the first time. Initialization can be avoided entirely if the object is initialized by some other means, such as placing the data to a buffer.

Described above have been various embodiments pertaining to message-passing in a cluster-on-chip computing environment. Prior to performing message passing, a determination may be made regarding whether a certain node is ready for message passing after system initialization. For example, a sender node that desires to initiate a message pass with a recipient node may need to confirm that the recipient node is ready and can receive messages by way of message passing. In an exemplary cluster-on-chip computing environment, each node can have a well known identifier that is universally known in the cluster-on-chip computing environment. Additionally, each node can have knowledge of where key exchange areas lie. Readiness of a node to communicate over a message buffer can be detected as follows: Initially each node can lay out a particular size location (e.g., 32 bit) that can be used for key exchange. Thereafter, when a one-way connection from a sender to a recipient needs to be established, the sender node and the target node can utilize the Shamir Three Pass Protocol, which can be described as follows: The sender node can take a random number K, and XOR this random number with its own node ID. The resulting value, $K_1$, can be placed at the recipient node's location. The recipient node can monitor its own location. As soon as its ID has been changed, it reads such value and XORs the value with the receiver node identifier, and writes the resulting value to the sender node's location. The sender node monitors its own location, and as soon as a value has been changed, reads such value and compares it with K. If the value does not match K, the sender node identifier writes the resulting value to the sender node's location. If the value does match K, the negotiation is assumed to be completed. The steps above can be completed until negotiation is finished.

Once negotiation is completed, the sender node can update a bitmap to know which nodes are ready for message passing communication. The above steps can be taken by both sender node and target node to establish bidirectional communication.

Using the process described above, when a node detects that another node is not yet ready for communicating over a message buffer, a connected node by its node ID and can retry after some threshold period of time has passed. For instance, the initial time may be T. Upon the expiration of T, the node may retry. If the node fails to detect the remote node's readiness to communicate, such node can keep tracking the node, but it increases the time interval for the next time, such as 2 T. This approach can reduce the potential of network flooding with readiness detection requests if some nodes do not initialize in a timely fashion, either due to hardware or software issues.

Figure 8:
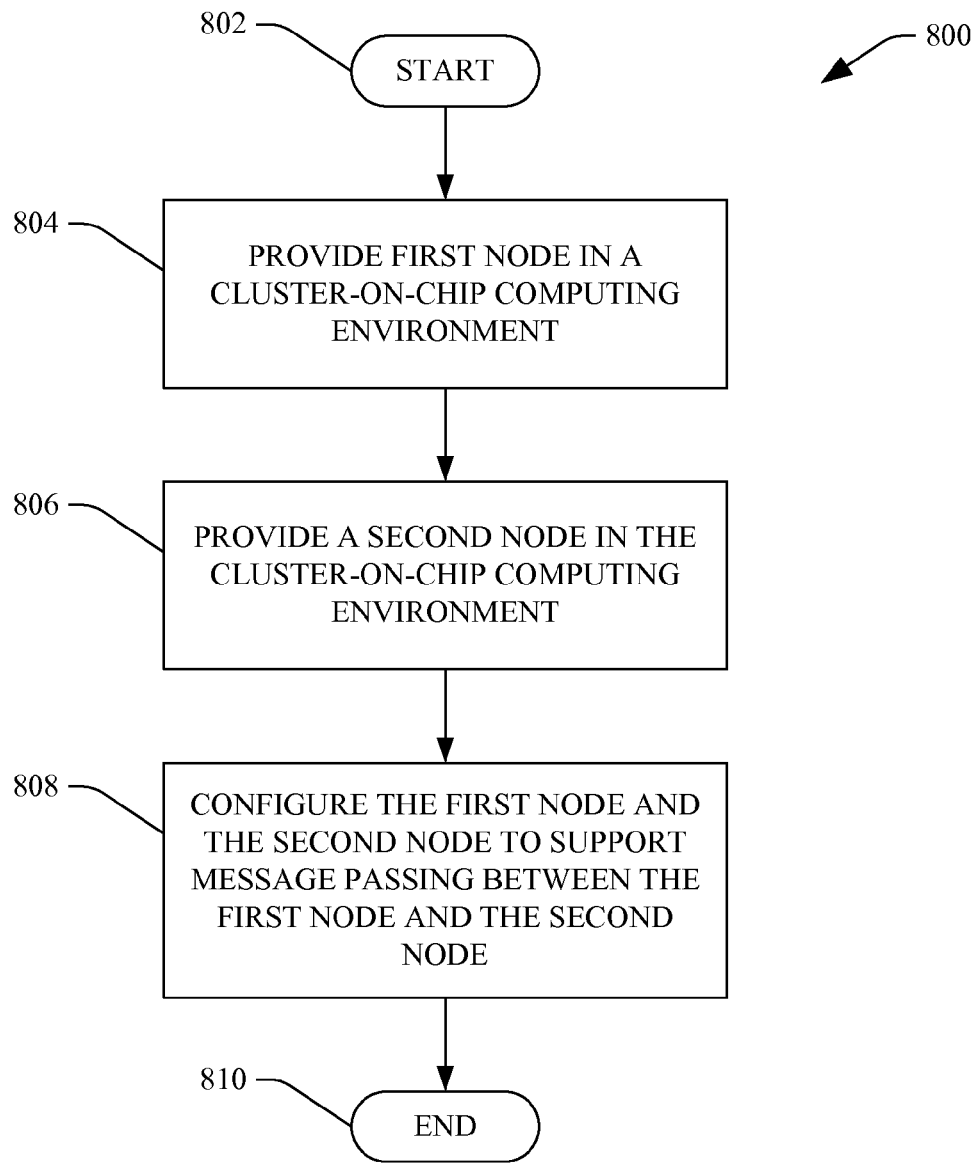
FIG. 8 is a flow diagram that illustrates an exemplary methodology for configuring nodes in a cluster-on-chip computing device to support message passing.

With reference now to FIG. 8, an exemplary methodology is illustrated and described. While the methodology is described as being a series of acts that are performed in a sequence, it is to be understood that the methodology is not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodology may be stored in a non-transitory computer-readable medium, displayed on a display device, and/or the like.

Referring now to FIG. 8, an exemplary methodology 800 that facilitates configuring a cluster-on-chip computing system to support message passing is illustrated. The methodology 800 starts at 802, and at 804 a first node in a cluster-on-chip computing environment is provided. The first node can comprise a first processor core and an operating system kernel executing thereon. Optionally, the first node can comprise a first associated local memory. The cluster-on-chip computing environment can comprise a plurality of nodes, wherein the plurality of nodes are in communication by way of a mesh network, and wherein each node has access to a range of memories with varying latencies (e.g., a local memory with low latency and a main memory with higher latency). For instance, the cluster-on-chip computing environment can further comprise main memory that is accessible to the plurality of nodes by way of a mesh network.

At 806, a second node in the cluster-on-chip computing environment can be provided, wherein the second node comprises a second processor core and another operating system kernel executing thereon. Optionally, the second processor core can comprise another associated local memory.

At 808, the first node and the second node can be configured to support message passing between the first node and the second node. Configuration of such nodes can include mapping memories to appropriate message buffers, supporting such message buffers, and various other configurations that have been described in greater detail above. The methodology 800 completes at 810.

Figure 9:
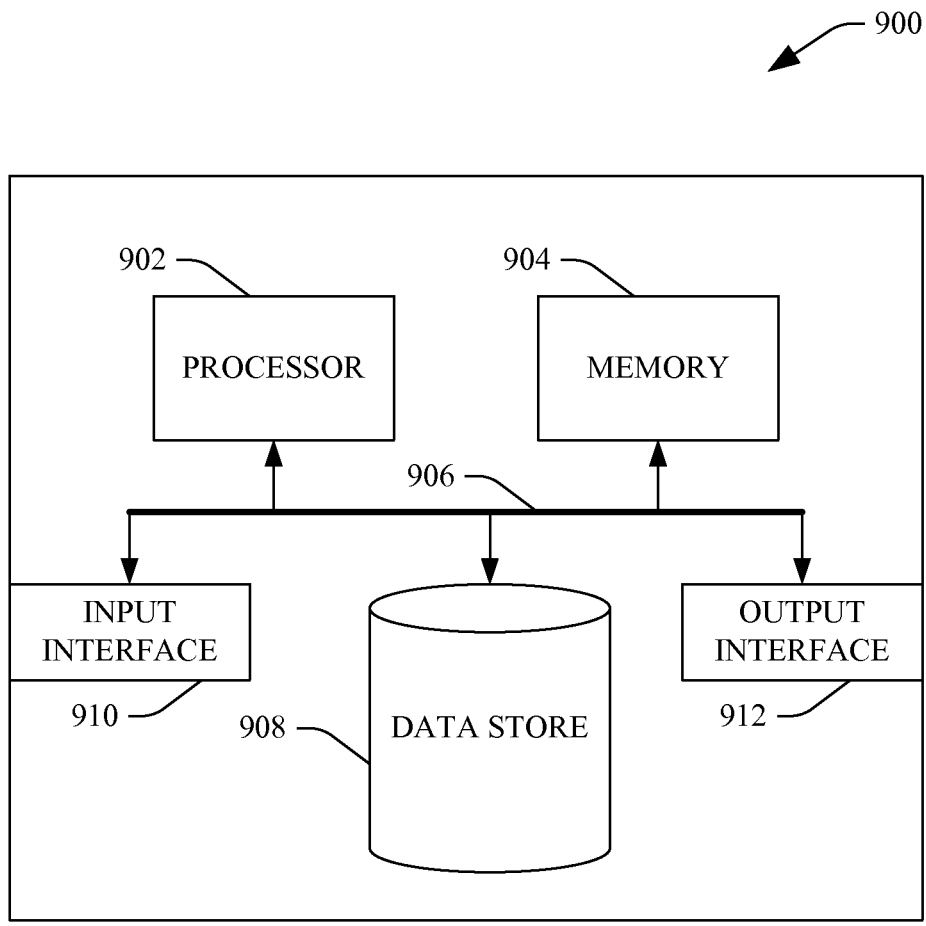
FIG. 9 is an exemplary computing system.

Now referring to FIG. 9, a high-level illustration of an exemplary computing device 900 that can be used in accordance with the systems and methodologies disclosed herein is illustrated. For instance, the computing device 900 may be used in a system that supports message passing. In another example, at least a portion of the computing device 900 may be used in a system that supports emulated dynamic memory access. The computing device 900 includes at least one processor 902 that executes instructions that are stored in a memory 904. The memory 904 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 902 may access the memory 904 by way of a system bus 906. In addition to storing executable instructions, the memory 904 may also store messages that are desirably transmitted between nodes in a cluster-on-chip computing environment.

The computing device 900 additionally includes a data store 908 that is accessible by the processor 902 by way of the system bus 906. The data store may be or include any suitable computer-readable storage, including a hard disk, memory, etc. The data store 908 may include executable instructions, messages, etc. The computing device 900 also includes an input interface 910 that allows external devices to communicate with the computing device 900. For instance, the input interface 910 may be used to receive instructions from an external computer device, from a user, etc. The computing device 900 also includes an output interface 912 that interfaces the computing device 900 with one or more external devices. For example, the computing device 900 may display text, images, etc. by way of the output interface 912.

Additionally, while illustrated as a single system, it is to be understood that the computing device 900 may be a distributed system. Thus, for instance, several devices may be in communication by way of a network connection and may collectively perform tasks described as being performed by the computing device 900.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices. Furthermore, a component or system may refer to a portion of memory and/or a series of transistors.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method, comprising:
   providing a first node in a cluster-on-chip computing environment, wherein the cluster-on-chip computing environment comprises a plurality of processor cores, wherein the plurality of processor cores are in communication by way of a mesh network, wherein each processor core has access to multiple memories with varying latencies, wherein the cluster-on-chip computing environment comprises main memory that is accessible to the plurality of processor cores by way of the mesh network, wherein the cluster-on-chip system fails to support hardware cache coherency, and wherein the first node comprises a first processor core, a first operating system kernel executing thereon, and a first memory including a message buffer, wherein the first operating system kernel is coupled to the first memory and the main memory; and
   providing a second node in the cluster-on-chip computing environment, wherein the second node comprises a second processor core and a second operating system kernel executing thereon, the first operating system kernel directing at least a portion of a message received by the first node from the second node to either the message buffer or to the main memory based at least in part on an expected frequency with which the first processor core may access the message and a latency of the message buffer.

2. The method of claim 1, further comprising configuring each node in the cluster-on-chip computing environment to support message passing between nodes, wherein each node comprises a processor core and a corresponding independent operating system kernel executing thereon.

3. The method of claim 1, wherein the first node has a second message buffer assigned thereto that is configured to receive messages from other nodes in the cluster-on-chip computing environment, wherein the second message buffer resides in the main memory, and wherein the main memory comprises off-chip memory that is separate from the first and second nodes.

4. The method of claim 3, wherein the first message buffer is a ring buffer, and wherein multiple nodes can write data to the ring buffer simultaneously.

5. The method of claim 4, further comprising:
   causing the second node to access a hardware lock for the first message buffer, wherein the second node accessing the lock prevents other nodes in the cluster-on-chip environment from allocating space in the first message buffer for messages;

causing the second node to locate a write pointer in the first message buffer, wherein the write pointer is at a first location in the first message buffer;

causing the second node to advance the write pointer to a second location in the first message buffer, wherein a distance between the first location and the second location is a size of a message that is desirably passed from the second node to the first node;

causing the second node to release the lock; and causing the second node to write the message to the first message buffer in a space between the first location in the first message buffer and the second location in the first message buffer.

6. The method of claim 5, further comprising:

causing the first node to access the lock subsequent to the second node releasing the lock, wherein the first node accessing the lock prevents other nodes in the cluster-on-chip environment from allocating space in the first message buffer for messages;

causing the first node to locate a read pointer in the first message buffer, wherein the read pointer is at the first location in the first message buffer;

causing the first node to read the message in the first message buffer starting from the first location.

7. The method of claim 6, further comprising:

causing a third node in the cluster-on-chip environment to copy a message to the first message buffer while the first node is reading data from the first message buffer, wherein the third node comprises a third processor core and a third operating system kernel executing thereon.

8. The method of claim 5, wherein the first message buffer is aligned to two consecutive regions in a virtual address space.

9. The method of claim 5, wherein the first message buffer is mapped to two different virtual memory ranges, wherein the virtual memory ranges have differing caching policies corresponding thereto.

10. The method of claim 1, further comprising:

providing a third node in the cluster-on-chip environment, wherein the third node comprises a third processor core and a third operating system kernel executing thereon, wherein the third node is dedicated to route data between other nodes in the cluster-on-chip environment.

11. The method of claim 1, further comprising:

causing the second node to pass a message to the first node, wherein the message comprises an object in a managed language, wherein the object in the managed language is not initialized.

12. The method of claim 1, further comprising:

causing the first node and the second node to participate in a 2-way handshake to indicate that the first node is prepared to receive a message from the second node.

13. The method of claim 1, the first memory of the first node further comprising a cache separate from the message buffer, the first operating system kernel requiring the second node to write messages to the message buffer of the first memory without accessing the cache.

14. A system, comprising:

a processor; and memory storing instructions that, when executed by the processor, cause the processor to:

transmit a message from a first node in a cluster-on-chip computing environment to a second node in the cluster-on-chip computing environment, wherein the first node comprises a first processor core and a first independent operating system kernel executing on the first processor core, wherein the second node comprises a second processor core and a second independent operating system kernel executing on the second processor core, wherein the first node and the second node have access to a plurality of memory pools with different latencies corresponding thereto, wherein the plurality of memory pools comprise a first memory on the first node, a second memory on the second node, and an off-chip main memory separate from the first and second nodes, the first memory including a message buffer, wherein a latency corresponding to the first memory is lower than a latency corresponding to the main memory with respect to the second node, and the first independent operating system kernel is coupled to the message buffer and the main memory; and store at least a portion of the message in one of the message buffer of the first memory or the main memory, the first independent operating system kernel directing the at least a portion of the message to the one of the message buffer or the main memory based at least in part on an expected frequency with which the first processor core may access the message and the latency corresponding to the first memory.

15. The system of claim 14, wherein the instructions cause the processor to:

determine that there is insufficient space in the message buffer of the first memory to store the message, partition the message, in response to determining that there is insufficient space, into a first portion and at least one second portion, a store the first portion of the message in the message buffer of the first memory, and store the at least one second portion of the message in at least one message buffer of the main memory.

16. The system of claim 15, wherein the first portion of the message stored in the message buffer of the first memory indicates the at least one message buffer of the main memory in which the at least one second portion of the message has been stored.

17. The system of claim 15, wherein the message buffer of the first memory comprises a plurality of message buffers organized in a predetermined hierarchy, the first independent operating system kernel requiring storage of the first portion of the message in a topmost message buffer of the hierarchy.

18. The system of claim 14, wherein the processor asynchronously stores the message in the message buffer of the first memory while other nodes are transmitting messages to the second node.

19. The system of claim 14, wherein the processor prevents allocation or de-allocation of space in the first memory to other nodes in the cluster-on-chip environment when a lock managed by the processor is held by either of the first node or the second node.

20. A cluster-on-chip computing environment, comprising:

a first node comprising a first processor core, a first operating system kernel executing on the first processor core, and a first memory including a message buffer and a cache;

a second node separate from the first node, the second node comprising a second processor core, a second operating system kernel executing on the second processor core, and a second memory; and a main memory separate from the first and second nodes, wherein the first operating system kernel is coupled to the first memory and the main memory, the second operating system kernel is coupled to the second memory and the main memory, and the first operating system kernel is configured to direct at least a portion of a message received by the first node to either the message buffer or to the main memory based at least in part on an expected frequency with which the first processor core may access the message and a latency of the message buffer.

* * * * *